United States Patent
Patton et al.

(10) Patent No.: US 9,135,020 B2
(45) Date of Patent: Sep. 15, 2015

(54) CORRELATION OF RESOURCES

(75) Inventors: Gordon Patton, Scotland (GB); Donald Fraser, Scotland (GB); Ian Joy, Scotland (GB)

(73) Assignee: NCR Corporation, Duluth, GA (US)

( * ) Notice: Subject to any disclaimer, the term of this patent is extended or adjusted under 35 U.S.C. 154(b) by 202 days.

(21) Appl. No.: 13/250,025

(22) Filed: Sep. 30, 2011

(65) Prior Publication Data

US 2013/0086592 A1    Apr. 4, 2013

(51) Int. Cl.
| | |
|---|---|
| *G06F 9/46* | (2006.01) |
| *G06Q 40/00* | (2012.01) |
| *G06F 15/173* | (2006.01) |
| *G06F 9/44* | (2006.01) |
| *G06F 9/445* | (2006.01) |
| *G07F 17/32* | (2006.01) |
| *G07F 19/00* | (2006.01) |
| *G07F 9/02* | (2006.01) |

(52) U.S. Cl.
CPC .......... *G06F 9/4411* (2013.01); *G06F 9/44521* (2013.01); *G07F 9/023* (2013.01); *G07F 17/323* (2013.01); *G07F 17/3227* (2013.01); *G07F 19/206* (2013.01); *G07F 19/211* (2013.01)

(58) Field of Classification Search
None
See application file for complete search history.

(56) References Cited

U.S. PATENT DOCUMENTS

| | | | | |
|---|---|---|---|---|
| 6,338,048 | B1* | 1/2002 | Mori .............................. | 705/41 |
| 7,613,643 | B1* | 11/2009 | Putman .......................... | 705/35 |
| 7,747,527 | B1* | 6/2010 | Korala ........................... | 705/43 |
| 8,090,744 | B1* | 1/2012 | Baird ............................. | 707/791 |
| 8,145,784 | B2* | 3/2012 | See et al. ...................... | 709/232 |
| 8,453,145 | B1* | 5/2013 | Naik .............................. | 718/1 |
| 2002/0004781 | A1* | 1/2002 | Forsyth ........................... | 705/39 |
| 2005/0060613 | A1* | 3/2005 | Cheng et al. .................... | 714/26 |
| 2006/0069692 | A1* | 3/2006 | Pernia .......................... | 707/100 |
| 2007/0011446 | A1* | 1/2007 | Kato et al. ..................... | 713/150 |
| 2007/0150749 | A1* | 6/2007 | Monaghan et al. ........... | 713/189 |
| 2008/0028169 | A1* | 1/2008 | Kaplan et al. ................. | 711/162 |
| 2008/0040404 | A1* | 2/2008 | Christiansen et al. ........ | 707/205 |
| 2008/0270587 | A1* | 10/2008 | Mason et al. ................. | 709/223 |
| 2009/0172419 | A1* | 7/2009 | Takayama ..................... | 713/193 |
| 2009/0222491 | A1* | 9/2009 | Larkin et al. ................. | 707/200 |
| 2010/0313105 | A1* | 12/2010 | Nekoomaram et al. ...... | 714/807 |

\* cited by examiner

*Primary Examiner* — Tammy Lee

(74) *Attorney, Agent, or Firm* — Joseph P. Mehrle

(57) ABSTRACT

A filter driver arranged to be executed on a processor of a terminal. The filter driver, when executed, is arranged to (i) receive a request for a first resource relating to a device installed in the terminal; (ii) determine if the requested first resource is appropriate for the device; and (iii) provide a second resource if the first resource is inappropriate for the device.

9 Claims, 3 Drawing Sheets

CORRELATION OF RESOURCES

FIELD OF THE INVENTION

This invention relates to the correlation of resources with a device. More specifically, but not exclusively, the invention relates to correlation of visual information with a device installed in a terminal, such as a self-service terminal.

BACKGROUND TO THE INVENTION

One type of self-service terminal is an automated teller machine (ATM). An ATM includes an application that provides visual cues and lead-through information to its users to help them operate the ATM correctly so that a high quality human-machine interface is provided. However, ATMs are highly configurable, and different versions of the same type of device may be installed on ATMs.

As used herein, a type of device relates to the function performed by a device. Those devices that perform the same (or a similar) function are of the same type. For example, a card reader is a type of device. A motorised card reader may be one version of that type of device; a dip card reader may be another version of that type of device. A different type of device may be a deposit module.

Different versions of the same type of device may be used within the same ATM network. For example, one ATM may have one version of a type of device; whereas, another ATM may have a different version of the same type of device. For example, one ATM may have a motorised card reader; another ATM may have a dip card reader. To ensure that each ATM has the correct visual cues and lead-through information, each ATM typically has an application that is tailored for the hardware configuration of that ATM. This tailored application includes images that are appropriate for those devices and those versions of devices that are installed on that ATM.

It is time-consuming to have to tailor an application so that it includes the correct images for the particular configuration of that ATM. There is also that problem that the tailored application may not be configured correctly at installation. Furthermore, the hardware configuration of the ATM may change subsequent to installation (for example, due to an upgrade of one version of a device for another version of a device that has more features) so that the tailored application may no longer have the correct images.

These problems are exacerbated by the fact that many types of devices (not just the card reader) may differ from one ATM configuration to another ATM configuration.

It would be advantageous to provide a system that could establish the correct linkage between an application and devices installed on a terminal at run-time rather than at installation.

Furthermore, the requirement to set up this linkage manually creates the possibility that the incorrect visual cue could be linked to a device. This would create confusion on the part of a user, resulting in a poor quality human-machine interaction. It would be a further advantage if this linkage could be created and/or updated automatically.

SUMMARY OF THE INVENTION

According to a first aspect there is provided a filter driver arranged to be executed on a processor of a terminal, when executed the filter driver being arranged to (i) receive a request for a first resource relating to a device installed in the terminal; (ii) determine if the requested first resource is appropriate for the device; and (iii) provide a second resource if the first resource is inappropriate for the device.

It should be appreciated that if the first resource is inappropriate for the device then the second resource is provided instead of the first resource.

The filter driver is preferably a file system filter driver that intercepts requests targeted at the file system. By intercepting the request before it reaches its intended target (the first resource), the filter driver can extend or replace functionality provided by the original target of the request.

The filter driver may be located within the operating system (OS) input-output (I/O) subsystem. The filter driver may be located between an I/O manager and the file system. For example, in a Microsoft Windows (trade mark) environment, a file system filter driver may be located between a Windows I/O Manager (or Windows I/O System Services) and a device driver for a data storage device on which the resources are stored.

In a Windows operating system, when an application performs an operation on a file (for example, to save a file, create a file, delete a file, and the like), the operating system creates a series of file input and output operations using discrete command packets called I/O Request Packets (IRPs). These IRPs are created by services provided by the operating system, such as NtReadFile and NtCreateFile. The I/O Manager delivers these IRPs to a file system driver that is responsible for managing that file. Windows enables filter drivers to be used so that the I/O Manager passes the IRPs to a filter driver instead of the file system driver. The filter driver can then modify the IRPs before delivering them to the file system driver.

In this aspect, the filter driver ascertains which resource is appropriate for a particular IRP. To implement this, the file system filter driver may include (or have access to) a configuration table. The configuration table provides information about whether a resource is appropriate for the current configuration of devices on the terminal, or whether a different resource should be provided. If a resource is appropriate, then a request for that resource is fulfilled in accordance with the request. If a resource is not (or no longer) appropriate, then a request for that resource is re-directed to a different (more appropriate) resource. This has the advantage that the application makes the same request regardless of the current configuration of the terminal, and the filter driver provides the most appropriate resource for that request. This ensures that the application does not need to be tailored to the version of device installed on the terminal.

The configuration table may include a unique string of characters associated with each type of device for which an I/O request for a resource may be made. Each unique string of characters may comprise a file name. The file name may include a parameter to identify a portion of the file to be accessed.

An application may be programmed to send I/O requests using the unique string of characters for a type of device (for example, the filename), without including any further parameters to specify the version of that type of device.

The resource may comprise an image, text, an audio file, a video file, a combination thereof, or the like.

The resource may be stored as an individual file on a storage device (such as a magnetic disk drive) or as a portion of a file. For example, a single data file may contain a plurality of images, each individually accessible (using a different unique string) via an I/O request. Such a data file may be referred to as an indexed file.

The first resource may comprise a collection of resources, and the second resource may comprise an individual resource contained within that collection of resources. Alternatively, the first resource may comprise an individual resource, or an individual resource within a collection of resources; and the second resource may comprise a different individual resource, or a different individual resource from a different collection of resources.

The file system filter driver may transmit, without modification, any I/O request that does not include a unique string listed in the configuration table.

The file system filter driver may register with a file system filter manager, or some other management component, of the operating system to ensure that I/O requests are passed to the file system filter driver.

The configuration table may be updated automatically by a configuration routine. The configuration routine preferably executes before the resource is accessed. Alternatively, a pre-defined table may be installed together with the file system filter driver.

The configuration routine may be a component of the file system filter driver. Alternatively, the configuration routine may be external to, but communicate with, the file system filter driver. In particular, the configuration routine may execute in user-mode rather than in kernel-mode.

The configuration routine may access a registry of the operating system and populate the configuration table based on the contents of the registry. The configuration routine may be programmed to match a device identifier from the registry with a device type and a device version. The configuration routine may access a version mapping table that contains a mapping of device versions to device identifiers in the registry.

Alternatively, the configuration routine may communicate with devices directly to populate the configuration table.

The device version may be associated with a resource. This association may be preset when the terminal is initially configured. Alternatively, or additionally, this association may be provided and/or updated by a remote host.

Alternatively, the configuration routine may access a unique serial number of the terminal and may transmit the unique serial number to a remote host and receive updated configuration table information therefrom.

The configuration table may be updated automatically by a remote host. Alternatively, the configuration table may be updated manually by a service engineer when a device on the terminal is replaced. The terminal may include a routine that prompts a service engineer to identify the version of device that has been installed and/or to select a resource (from a plurality of resources rendered simultaneously or consecutively on a display) that matches the version of device that has been installed.

The version of a device may include the location of the device on a self-service terminal, PC or cellphone. For example, one version of a USB socket may comprise an "A-type" USB socket located on a rear of a laptop; whereas another version of a USB socket may comprise an "A-type" USB socket located on a left-hand side of the laptop. Each version may be associated with a different resource that indicates the location of the USB socket to a user.

The device may comprise any of the following: a card reader, a cash deposit module, a cheque deposit module, a cash dispenser, a barcode scanner, a keypad, a safe, a touch screen, function defined keys (FDKs), a printer, a passport scanner, a biometric scanner, a display, an envelope deposit module, a passbook reader, media entry indicators, USB ports, an audio socket, a microphone socket, a cash recycler module, a combined check and cash depository, an operator panel (for use by service personnel), and the like.

The filter driver may register to intercept all I/O requests to data files. Alternatively, the filter driver may only register to intercept I/O requests to data files that emanate from a specific application (for example, I/O requests from a transaction application). This would allow other applications (for example, a web browser, a graphical viewer application, and the like) to view all of the resources without being re-directed. The file system filter driver may register to intercept only a sub-set of I/O requests, such as file read commands, either from all applications or only some applications, or only one application.

According to a second aspect there is provided a processor executing a filter driver according to the first aspect installed therein.

According to a third aspect there is provided a terminal comprising a processor according to a second aspect.

The terminal may be any one of the following: an ATM, a point of sale (POS) terminal, a self-service POS terminal, an information kiosk, an electronic funds transfer (EFT) terminal, a financial services centre, a bill payment kiosk, a lottery kiosk, a postal services machine, a smartphone, a PC, a digital camera, a photocopier, a vending machine, a check-in and/or check-out terminal such as those used in the retail, hotel, car rental, gaming, healthcare, and airline industries, or any other computing device having I/O access.

According to a fourth aspect there is provided a data storage device, the data storage device having a filter driver according to the first aspect stored thereon, the filter driver being arranged to install into a processor of a terminal upon the data storage device being coupled to the terminal.

According to a fifth aspect there is provided a method of providing appropriate resources to a terminal for presenting to a user of the terminal, the method comprising: receiving a request for a first resource relating to a device installed in the terminal; ascertaining if the requested first resource is appropriate for the device; and providing a second resource if the first resource is inappropriate for the device.

The step of ascertaining if the requested first resource is appropriate for the device may include accessing a configuration table.

The step of accessing a configuration table may include ascertaining if a unique string provided in the request for the first resource matches an entry in the configuration table.

If the unique string provided in the request for the first resource matches an entry in the configuration table, then the step of providing a second resource may include sending a request for a second resource using a replacement string obtained from that matching entry in the configuration table. In other words, if the configuration table has an entry in which the string is stored, then the filter driver uses a replacement string contained in that configuration table entry.

The configuration table may store, for each type of device installed in a terminal, a unique string and a replacement string for that unique string.

The step of ascertaining if the requested first resource is appropriate for the device may include ignoring any request that does not include a unique string listed in the configuration table.

The method may include the further step of updating the configuration table to ensure that devices are matched to appropriate resources.

The step of updating the configuration table to ensure that devices are matched to appropriate resources may include the further step of accessing a registry of the operating system and populating the configuration table based on the contents of the registry.

The step of updating the configuration table to ensure that devices are matched to appropriate resources may include the further steps of: accessing a unique serial number of the terminal; transmitting the unique serial number to a remote host; and receiving updated configuration table information therefrom.

BRIEF DESCRIPTION OF THE DRAWINGS

Embodiments of the present invention will now be described, by way of example only, with reference to the accompanying drawings, in which.

DETAILED DESCRIPTION

Figure 1:
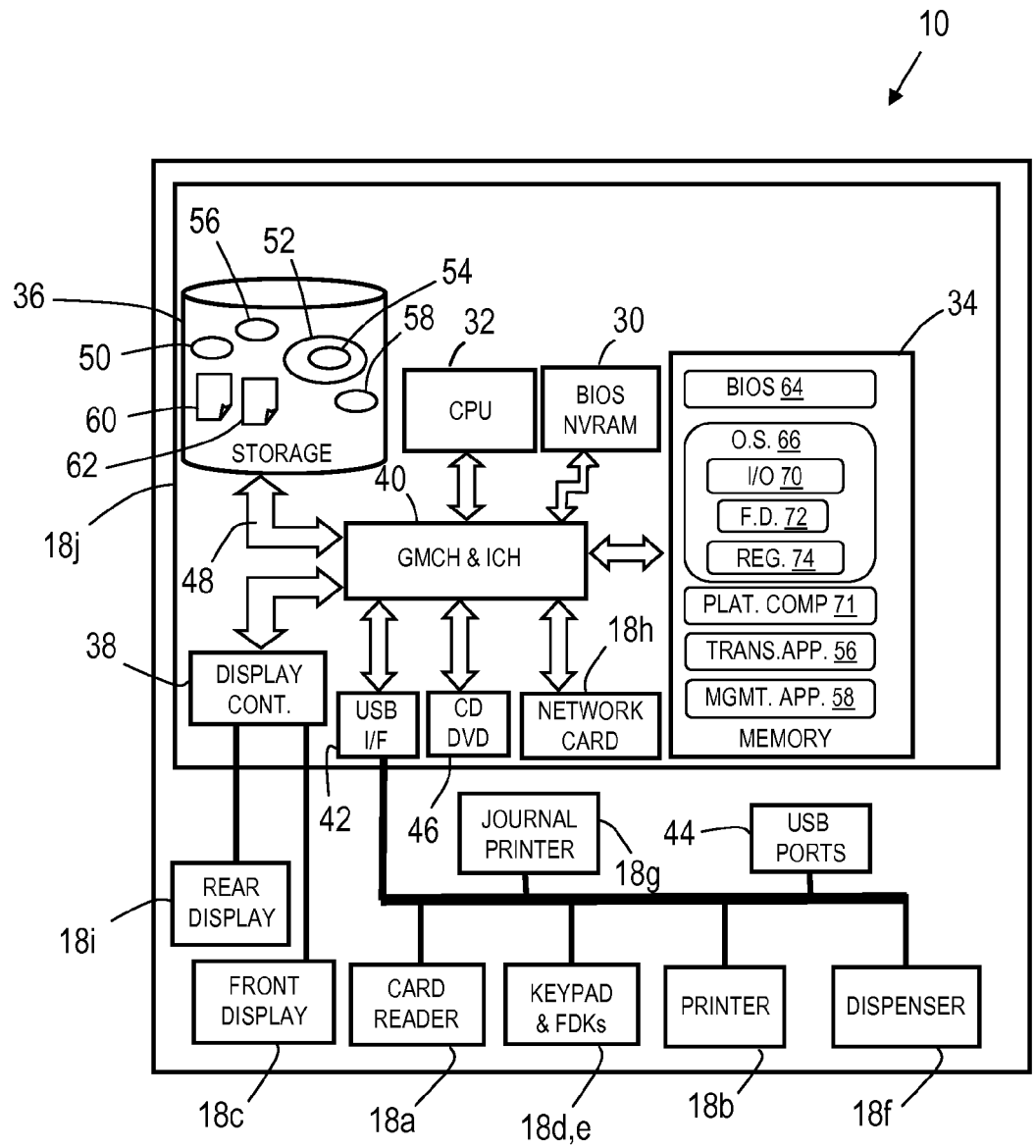
FIG. 1 is a simplified schematic diagram of components within a terminal (in the form of an ATM) including a filter driver according to one embodiment of the present invention.

Reference is first made to FIG. 1, which is a simplified schematic diagram of a terminal 10, in the form of an automated teller machine (ATM), according to one embodiment of the invention.

The ATM 10 comprises various devices 18 mounted therein. These devices 18 include: a card reader device 18a; a receipt printer device 18b; a display 18c and associated function defined keys (FDKs) 18d disposed as two columns, each on opposing sides of the display 18c; an encrypting keypad device 18e; a dispenser device 18f; a journal printer device 18g for creating a record of every transaction executed by the ATM 10, a network connection device 18h for accessing a remote authorisation system (not shown), a rear (service engineer) operator panel (including control switches in the form of small FDKs) 18i, and a controller device 18j (in the form of a PC core) for controlling the operation of the ATM 10, including the operation of the other devices 18.

The controller 18j comprises a plurality of conventional PC devices (not all of these are shown in detail). These devices include: a BIOS EEPROM 30, a processor 32, associated main memory 34, storage space 36 in the form of a magnetic disk drive, and a display controller 38 in the form of a graphics card. The controller 18j also includes a controller hub 40 comprising a graphics and memory controller hub (GMCH) and an input/output controller hub (ICH). The controller hub 40 is based on a conventional chipset.

The controller hub 40 provides ports, bridges, and interfaces for various input/output devices. The controller hub 40 provides a USB interface 42 to which many of the devices 18 are coupled, and which has a plurality of USB ports 44 to which additional USB devices (such as a removable USB storage device) can be coupled.

The controller hub 40 also provides an interface 46 to a CD-ROM drive and/or a DVD drive, and a disk interface 48 to which the disk drive 36 is coupled.

The disk drive 36 stores executable files and data files.

The executable files (shown as ellipses in FIG. 1) include: a set of operating system files 50 (in this embodiment, the operating system files comprise a conventional Microsoft Windows XP (trade mark) operating system); platform components 52 (including a custom file system filter driver 54); a transaction application 56; and a management application 58.

The data files (shown as rectangles in FIG. 1) include a collection of screen sequence files 60 (which includes all of the screens that may be used in a transaction), a card reader resource file 62 (which includes a graphical image for each version of card reader that could be installed on the ATM), and other resource files (not illustrated).

The platform components 52 include drivers for ATM specific devices (such as the card reader device 18a), and various components for providing enhanced management and functionality for the devices in the ATM 10. In this embodiment, the platform components 52 comprise is a set of APTRA (trade mark) XFS components, available from NCR Corporation, 3097 Satellite Blvd., Duluth, Ga. 30096, U.S.A. The platform components 52 provide a range of programming facilities specific to self-service terminal devices and services.

When the ATM 10 is booted up, the processor 32 loads BIOS code 64 from the BIOS EEPROM 30 into main memory 34. The processor 32 then accesses the disk drive 36 and loads the main memory 34 with software components, as will now be described.

The processor 32 loads an operating system kernel 66 from the set of operating system files 50 into the main memory 34. When loading the operating system kernel 66, the processor 32 loads an I/O file sub-system 70 from the set of operating system files 50, and also loads platform components 71, including the custom file system filter driver 72, into the memory 34. The reason that the platform components and file system filter driver are labelled 52 and 54 when located on the disk drive 36 but are labelled 71 and 72 when executing in the memory 34 is to indicate that the version executing in memory is an instantiated version of the serialized data file stored in the disk drive 36.

As is known to those of skill in the art, the operating system kernel 66 includes, inter alia, a registry 74 that includes details of the device drivers that are loaded.

The processor 32 also loads the transaction application 56 and the management application 58 into the main memory 34.

The transaction application 56 provides transaction processing functions for customers of the ATM 10 to allow these customers to execute transactions at the ATM 10. These transaction processing functions include providing a sequence of screens on the customer display 18c of the ATM 10 to guide a customer through a transaction, as well as controlling the devices 18.

The management application 58 provides device management functions to allow service engineers (and other authorised personnel) to replenish, diagnose, maintain, and repair devices 18 in the ATM 10.

Figure 2:
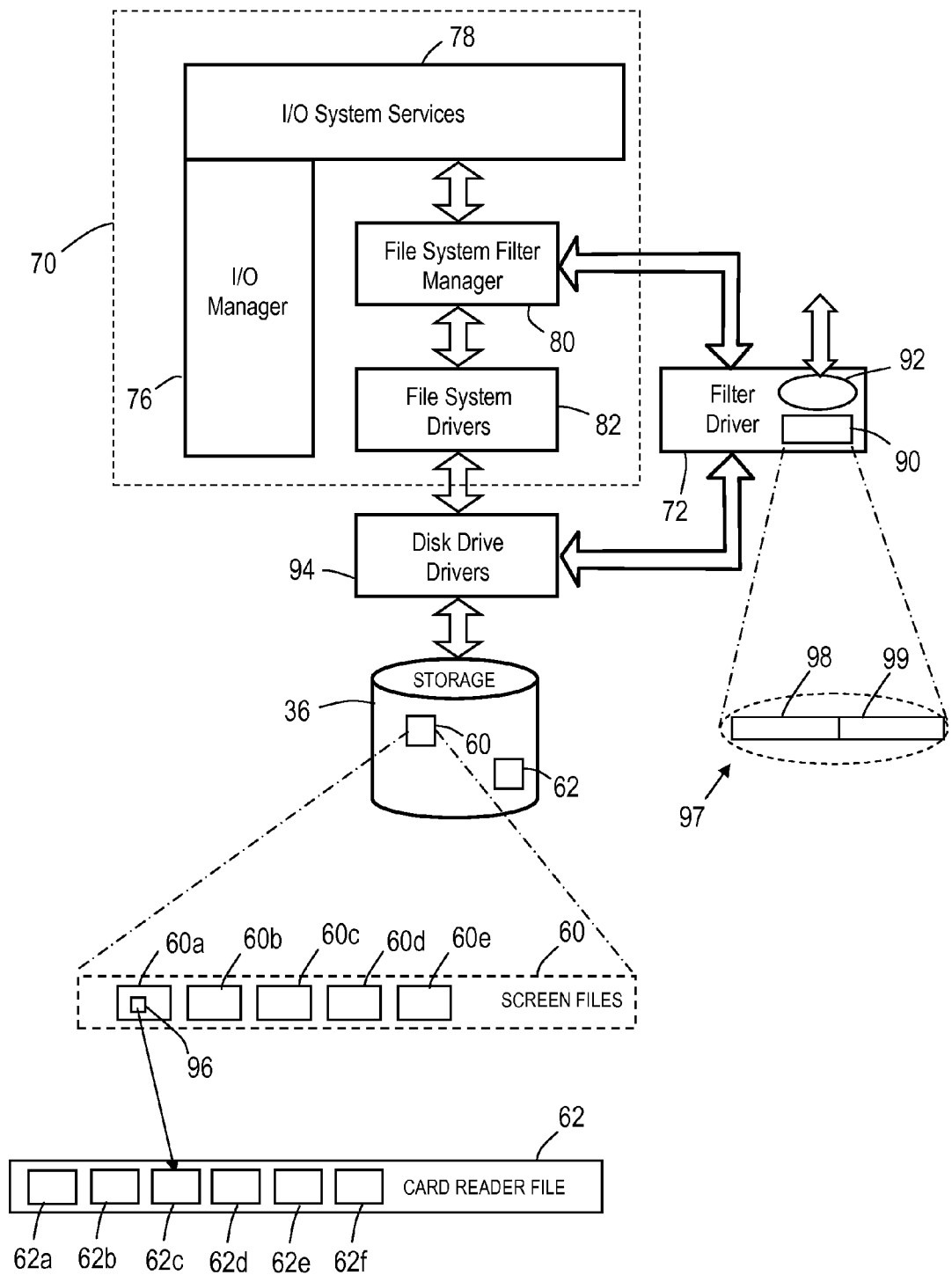
FIG. 2 is a graphical representation of software components of the ATM of FIG. 1, including an input-output (I/O) subsystem and the filter driver.

Reference will now also be made to FIG. 2, which is a simplified graphical representation of the I/O file sub-system 70 and the custom file system filter driver 72 interacting with data files (screen sequence files 60 and card reader resource file 62) stored on the disk drive 36.

The I/O file sub-system 70 is conventional and comprises an I/O manager 76, I/O system services 78, a file system filter manager 80, and conventional file system drivers 82.

As is known in the art, the I/O manager 76 exposes device information to the operating system and applications (such as the transaction application 56 and the management application 58), allocates memory to an Input/Output Request Packet (IRP), and initializes the IRP.

The I/O system services 78 receives and responds to requests from other components in the operating system kernel 66 to access data files stored in memory 34 or on the disk drive 36.

The file system filter manager 80 routes I/O requests. In this embodiment, the filter driver 72 is registered with the file system filter manager 80 so that the filter manager 80 routes all file I/O requests to the filter driver 72 rather than to the conventional file system drivers 82. In this example, similar results would be obtained if the filter driver 72 only registered to intercept read requests (that is, a sub-set of possible I/O requests) because this example focuses on re-directing read requests.

The filter driver 72 includes a configuration table 90 and a configuration routine 92 operable to interrogate the registry 74 and update the configuration table 90 with information derived from the registry 74.

The platform components 71 include a disk drive driver 94, which is a conventional driver provided by the manufacturer of the disk drive 36 (or by the operating system files 50).

Figure 3:
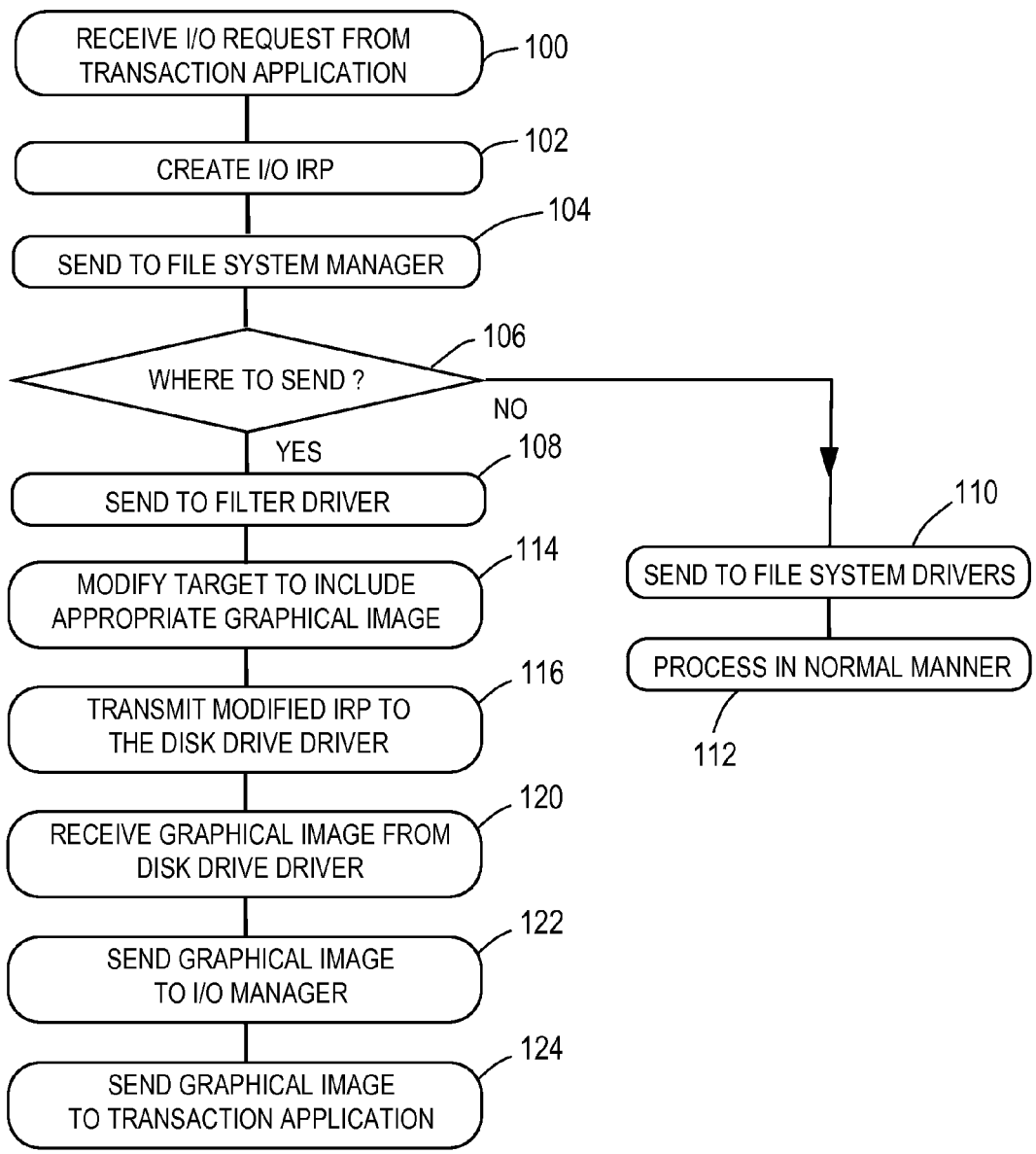
FIG. 3 is a flowchart detailing steps performed by the software components of FIG. 2 in responding to a request for a resource.

The operation of these software components will now be described with reference to FIG. 3, which is a flowchart illustrating the steps performed by the I/O subsystem 70 and filter driver 72 in responding to a request for a resource.

During a transaction, the transaction application 56 accesses screens from the collection of screen sequence files 60. The screen sequence files are organized so that each screen is individually accessible. Five of these screens are illustrated in FIG. 2 and are labeled 60a through 60e, although many more screens than five would be used in most practical ATM embodiments.

In this example, the screen being rendered by the transaction application 56 is the card insertion screen 60a. This screen 60a includes a reference (illustrated by block 96) to a resource. In this example, the resource is a graphical image of a card reader to aid a customer of the ATM 10 in locating the card reader 18a and inserting his/her ATM card correctly. The reference 96 comprises a unique string that includes the filename of the card reader resource file 62. However, the reference 96 does not include any specific reference to a graphical image stored in the card reader resource file 62.

As illustrated in FIG. 2, the card reader resource file 62 includes a plurality of individually accessible graphical images (labeled 62a to 62f), each relating to a different version of card reader or a different card reader location.

When the transaction application 56 renders this card insertion screen 60a on the customer display 18c, the transaction application 56 issues a read request (by calling an I/O system service) for the reference 96 included in that screen 60a. This read request is passed to the I/O subsystem 70 in a conventional manner (full details of this conventional process and other conventional Windows processes are available on the Microsoft Developers Network web site).

The I/O manager 76 and I/O system services component 78 receive this request (step 100) and create the appropriate Input/Output Request Packet (IRP) (step 102). The IRP includes the unique string from the reference 96 as the target.

The I/O manager 76 then passes this IRP to the file system filter manager 80 (step 104).

The file system filter manager 80 then ascertains where the IRP should be directed (step 106). In this example, the filter driver 72 has registered with the file system filter manager 80 to receive all I/O requests, so the file system filter manager 80 forwards the IRP to the filter driver 72 (step 108). If the filter driver 72 had only registered with the file system filter manager 80 to receive some requests, and this request was not one of them, then the file system filter manager 80 would direct the request to the file system drivers 82 (step 110) and processing would continue as for a normal I/O request in a conventional manner (step 112).

When the filter driver 72 receives the IRP, it then modifies the target (that is, the unique string from the reference 96) to include a reference to the appropriate graphical image in card reader file 62 (step 114). In this example, this is graphical image 62c. This is implemented by the filter driver 72 accessing the configuration table 90, which has been populated by the configuration routine 92.

The configuration table 90 includes an entry 97 (shown expanded within a broken ellipse in FIG. 2) for the reference 96. The entry 97 comprises an index field 98 containing the unique character string from the reference 96, and a replacement field 99 containing a replacement reference. The replacement reference (also referred to as a modified target) identifies the location of a resource that is appropriate for the version of device corresponding to the reference 96. In this example, the replacement reference for reference 96 includes a filename for the card reader resource file 62 and a parameter indicating which graphical image in the sequence (that is, image 62c) is appropriate for the card reader 18a that is currently installed in the ATM 10.

The filter driver 72 then transmits the modified IRP (with the modified target, that is, the replacement reference) to the disk drive driver 94 (step 116).

The disk drive driver 94 receives this modified IRP, accesses the relevant portion of the card reader file 62 (namely, graphical image 62c), and returns the requested graphical image to the filter driver 72.

The filter driver 72 receives this graphical image (step 120) and passes it to the I/O manager 76 (step 122), which passes it to the transaction application 56 (step 124).

The transaction application 56 then renders the card insertion screen 60a, which includes the graphical image 62c.

The configuration routine 92 periodically accesses the registry 74 to ascertain if any changes have been made to the devices 18 installed in the ATM 10. If any changes have been made, the configuration routine 92 updates the configuration table 90. For example, if a new card reader is added instead of card reader 18a, then the configuration routine 92 ascertains the most appropriate image for that new card reader and adds a new replacement reference to the replacement field 99. This is implemented by the configuration routine 92 accessing a device table (not shown) that lists the graphical images that correspond to the device identifiers that are used in the registry 74.

It will now be appreciated that this embodiment enables a transaction application 56 to send a request for a resource for a version of a device without the transaction application 56 having to be hard-coded with the correct resource for that device.

Various modifications may be made to the above described embodiment within the scope of the present invention. For example, in the above embodiment, the target was a data file containing a plurality of resources, and the filter driver specified the particular resource within that data file. In other embodiments, the target may include a reference to a specific resource, which is changed by the filter driver to a reference to a different resource.

It will be further appreciated that although described with reference to one type of device (a card reader) on one type of terminal (an ATM) the present invention is applicable to many different devices (USB ports, cash accept modules, keypads, and the like) on many different terminals (kiosks, smartphones, PCs, vehicle entertainment devices, and the like).

Furthermore, in the above embodiment, the re-direction was performed based on the most appropriate resource for an installed device. In other embodiments, the re-direction may be performed based on any other convenient contextual or environmental information, such as the time, date, software configuration, physical location (based on GPS co-ordinates), temperature, humidity, or the like.

As described above, the update to the configuration table was implemented using the registry; however, in other embodiments, the configuration table may be updated in different ways (for example, manually by a service engineer; automatically using a dedicated program, or in any other convenient manner).

It will also be appreciated that the steps of the methods described herein may be carried out in any suitable order, or simultaneously where appropriate. The methods described herein may be performed by software in machine readable form on a tangible storage medium or as a propagating signal.

What is claimed is:

1. A filter driver stored as executable instructions in a non-transitory computer-readable storage medium, the executable instructions executed on a processor of a terminal, and arranged to:

(i) intercept, by the processor, a request for a first resource relating to a device installed in the terminal that is an Automated Teller Machine (ATM) and the first resource is accessible from the ATM without a network connection and is one or more of: an image file, a text file, an audio file and a video file and the device is one of: a cash or check deposit device, a cash dispenser device, a scanner device, a keypad device, a printer device, a display device, a reader device, and a port device, and wherein the request intercepted by intercepting Input/Output directed to data files that emanate from a specific application processing on the ATM, (ii) determine, by the processor, if the requested first resource is appropriate for the device, ascertain, by the processor, if the requested first resource is appropriate for the device by accessing a configuration table after first determining when the configuration table should be updated and when updating is needed send a serial number for the ATM to a remote host and receive from that remote host the updated configuration table; and (iii) provide, by the processor, a second resource from the terminal by modifying the Input/Output Request Packet to include a reference to a second resource and routing the modified Input/Output Request Packet to the device for processing and identifying the second resource as a different individual resource from a different collection of resources from that which is associated with the first resource, and provide the second resource when a unique string provided in the request for the first resource matches an entry in the configuration table for the second resource indicating that the first resource is inappropriate for the device.

2. A filter driver according to claim 1, wherein the filter driver includes the configuration table.

3. A filter driver according to claim 2, wherein the configuration table provides information about whether a resource is appropriate for the current configuration of devices on the terminal, or whether a different resource should be provided.

4. A filter driver according to claim 3, wherein the configuration table includes a unique string of characters associated with each type of device for which an I/O request for a resource may be made.

5. A filter driver according to claim 3, wherein the filter driver further comprises a configuration routine that updates the configuration table.

6. A filter driver according to claim 5, wherein the configuration routine accesses a registry of an operating system and populates the configuration table based on the contents of the registry.

7. A filter driver according to claim 1, wherein the filter driver registers to intercept all I/O requests to the data files.

8. A method of providing appropriate resources to a terminal for presenting to a user of the terminal residing in a non-transitory computer-readable storage medium and executed by a processor, the method comprising:

receiving, by the processor, a request for a first resource relating to a device installed in the terminal that is an Automated Teller Machine (ATM), the request represented in an Input/Output Request Packet directed to the device and the first resource is accessible from the ATM without a network connection and is one or more of: an image file, a text file, an audio file and a video file and the device is one of: a cash or check deposit device, a cash dispenser device, a scanner device, a keypad device, a printer device, a display device, a reader device, and a port device;

ascertaining, by the processor, if the requested first resource is appropriate for the device by accessing a configuration table after first determining when the configuration table should be updated and when updating is needed sending a serial number for the ATM to a remote host and receiving from that remote host the updated configuration table; and providing, by the processor, a second resource from the terminal by modifying the Input/Output Request Packet to include a reference to a second resource and routing the modified Input/Output Request Packet to the device for processing and identifying the second resource as a different individual resource from a different collection of resources from that which is associated with the first resource, wherein providing further includes providing the second resource when a unique string provided in the request for the first resource matches an entry in the configuration table for the second resource indicating that the first resource is inappropriate for the device.

9. A method according to claim 8, wherein the step of ascertaining if the requested first resource is appropriate for the device includes transmitting without modification any request that does not include the unique string listed in the configuration table.

* * * * *